US010956998B1

(12) United States Patent
Lewis et al.

(10) Patent No.: US 10,956,998 B1
(45) Date of Patent: Mar. 23, 2021

(54) APPARATUS AND METHOD FOR SUBSEQUENT REFERENCE INFORMED LEGAL RESEARCH

(71) Applicant: RELX Inc., New York, NY (US)

(72) Inventors: Daniel Lewis, Nicasio, CA (US); Nicholas Reed, San Francisco, CA (US)

(73) Assignee: RELX Inc., New York, NY (US)

( * ) Notice: Subject to any disclaimer, the term of this patent is extended or adjusted under 35 U.S.C. 154(b) by 1450 days.

(21) Appl. No.: 14/938,681

(22) Filed: Nov. 11, 2015

Related U.S. Application Data

(60) Provisional application No. 62/078,897, filed on Nov. 12, 2014.

(51) Int. Cl.
G06Q 50/18 (2012.01)

(52) U.S. Cl.
CPC .................... G06Q 50/18 (2013.01)

(58) Field of Classification Search
CPC ................................................ G06Q 50/18
See application file for complete search history.

(56) References Cited

U.S. PATENT DOCUMENTS

| | | | |
|---|---|---|---|
| 2006/0287971 A1* | 12/2006 | Armstrong | G06F 17/30728 |
| 2011/0066616 A1* | 3/2011 | Rhoads | G06F 17/30728 |
| | | | 707/737 |
| 2013/0006764 A1* | 1/2013 | Zhang | G06Q 30/0254 |
| | | | 705/14.52 |

\* cited by examiner

*Primary Examiner* — Julie M Shanker
(74) *Attorney, Agent, or Firm* — Dinsmore & Shohl LLP

(57) ABSTRACT

A non-transitory computer readable storage medium has instructions executed by a processor to supply text from a court decision. Indicia of the number of subsequent citations to the court decision are provided adjacent to the text. The indicia include at least one of a case citation count and associated visualization, a page citation count and associated visualization and page rank indicia.

20 Claims, 6 Drawing Sheets

BASIC INC. v. LEVINSON
BASIC INC. ET AL. v. LEVINSON ET AL.

485 U.S. 224 (1988)
No. 86-279.
Supreme Court of United States.
Argued November 2, 1987
Decided March 7, 1988

Lorem ipsum dolor sit amet, consectetur adipiscing elit. In dapibus orci sed purus hendrerit volutpat eu eget urna. Phasellus ac molestie lorem, eget lacinia dui. Vivamus mattis a urna vel consectetur. Pellentesque consequat pulvinar sapien eu ullamcorper. Mauris vestibulum magna non sollicitudin malesuada. Duis neque magna, efficitur non velit id, accumsan tempor dui. Mauris non dui lacus. Curabitur dapibus maximus ante et laoreet. Pellentesque habitant morbi tristique senectus et netus et malesuada fames ac turpis egestas. Curabitur semper dolor semper neque lobortis dignissim. Nunc varius, lacus sit amet ornare ultricies, ex augue vestibulum purus, ut porta ipsum metus at neque.

Cras fermentum, diam at lacinia consequat, tortor eros maximus velit, ut dignissim felis tortor ut est. Nam fermentum neque et tristique consequat. Nam et erat neque. Vestibulum vel mauris nec sapien luctus tempor. Vivamus odio metus, pretium vitae nibh in, molestie posuere nulla.

Opinion History

This opinion was cited 56 times in 1989

Page 224 ★★★★☆

This page has been cited 418 times since 1988

How this page has been cited:

Lorem ipsum dolor sit amet, consectetur elit. Proin scelerisque eros eu eros pretium, mi vestibulum. Quisque efficitur eros ut eu consectetur felis malesuada. Aenean +76 similar citations Fusce mattis tellus nunc, id ullamcorper metus facilisis et. Quisque velit metus, sollicitudin eget lacus sed, vestibulum suscipit urna. Vestibulum a dictum turpis, +117 similar citations Nulla posuere venenatis lorem, vel dictum ante. Nunc pellentesque orci pulvinar ipsum fringilla, ac laoreet +65 similar citations

BASIC INC. v. LEVINSON
BASIC INC. ET AL. v. LEVINSON ET AL.

485 U.S. 224 (1988)
No. 86-279.
Supreme Court of United States.
Argued November 2, 1987
Decided March 7, 1988

Lorem ipsum dolor sit amet, consectetur adipiscing elit. In dapibus orci sed purus hendrerit volutpat eu eget urna. Phasellus ac molestie lorem, eget lacinia dui. Vivamus mattis a urna vel consectetur. Pellentesque consequat pulvinar sapien eu ullamcorper. Mauris vestibulum magna non sollicitudin malesuada. Duis neque magna, efficitur non velit id, accumsan tempor dui. Mauris non dui lacus. Curabitur dapibus maximus ante et laoreet. Pellentesque habitant morbi tristique senectus et netus et malesuada fames ac turpis egestas. Curabitur semper dolor semper neque lobortis dignissim. Nunc varius, lacus sit amet ornare ultricies, ex augue vestibulum purus, ut porta ipsum metus at neque.

Cras fermentum, diam at lacinia consequat, tortor eros maximus velit, ut dignissim felis tortor ut est. Nam fermentum neque et tristique consequat. Nam et erat neque. Vestibulum vel mauris nec sapien luctus tempor. Vivamus odio metus, pretium vitae nibh in, molestie posuere nulla.

FIG. 2

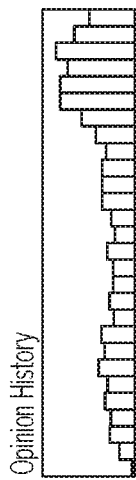

Opinion History

This opinion was cited 3708 times since 1988

Page 224 ★★★★☆ This page has been cited no more than 100 times. ~300

This page has been cited 418 times since 1988

How this page has been cited

Lorem ipsum dolor sit amet, consectetur elit. Proin scelerisque eros eu eros pretium, mi vestibulum. Quisque efficitur eros ut eu consectetur felis malesuada. Aenean +76 similar citations BASIC INC. v. LEVINSON BASIC INC. ET AL. v. LEVINSON ET AL.

485 U.S. 224 (1988)
No. 86-279.
Supreme Court of United States.
Argued November 2, 1987
Decided March 7, 1988

Lorem ipsum dolor sit amet, consectetur adipiscing elit. In dapibus orci sed purus hendrerit volutpat eu eget urna. Phasellus ac molestie lorem, eget lacinia dui. Vivamus mattis a urna vel consectetur. Pellentesque consequat pulvinar sapien eu ullamcorper. Mauris vestibulum magna non sollicitudin malesuada. Duis neque magna, efficitur non velit id, accumsan tempor dui. Mauris non dui lacus. Curabitur dapibus maximus ante et laoreet. Pellentesque

FIG. 3

| relevance | date | jurisdiction | 0% | 🖨 PRINT |

☆☆☆☆ p.224

~~~~~~~~~~~~~~~

"Lorem ipsum dolor sit amet, consectetur adipiscing elit. In purus hendrerit volutpat eu eget urna. Phasellus ac molestie lacinia dui. Vivamus mattis a urna vel consectetur. pulvinar sapien eu ullamcorper."

Cras fermentum, diam at lacinia consequat, tortor eros dignissim felis tortor ut est. Nam fermentum neque et Nam et erat neque. Vestibulum vel mauris nec sapien Vivamus odio metus, pretium vitae nibh in, molestie ▽ click to expand 251 similar citations ▽

"Lorem ipsum dolor sit amet, consectetur adipiscing elit. In purus hendrerit volutpat eu eget urna. Phasellus ac molestie lacinia dui. Vivamus mattis a urna vel consectetur. pulvinar sapien eu ullamcorper."

Cras fermentum, diam at lacinia consequat, tortor eros dignissim felis tortor ut est. Nam fermentum neque et Nam et erat neque. Vestibulum vel mauris nec sapien Vivamus odio metus, pretium vitae nibh in, molestie ▽ click to expand 157 similar citations ▽

"Lorem ipsum dolor sit amet, consectetur adipiscing elit. In purus hendrerit volutpat eu eget urna. Phasellus ac molestie lacinia dui. Vivamus mattis a urna vel consectetur. pulvinar sapien eu ullamcorper."

Cras fermentum, diam at lacinia consequat, tortor eros dignissim felis tortor ut est. Nam fermentum neque et Nam et erat neque. Vestibulum vel mauris nec sapien Vivamus odio metus, pretium vitae nibh in, molestie ▽ click to expand 104 similar citations ▽

See 54 other citations:

Cras fermentum, diam at lacinia consequat, tortor eros dignissim felis tortor ut est. Nam fermentum neque et Nam et erat neque. Vestibulum vel mauris nec sapien Vivamus odio metus, pretium vitae nibh in, molestie ▽ click to expand 54 citations ▽ — 400

---

Lorem ipsum do consectetur adi In dapibus orci purus hendrerit eget urna. Phas molestie lorem, lacinia dui. Viva a urna vel cons Pellentesque co pulvinar sapien malesuada. Duis Mauris non dui habitant morbi Curabitur sem

¶1   JUSTICE

¶2   Lorem ipsum dolor purus hendrerit volutpat lacinia dui. Vivamus pulvinar sapien eu ullam malesuada. Duis neque Mauris non dui lacus. habitant morbi tristique et netus et malesuada Curabitur semper dolor lobortis dignissim. Nunc lacus sit amet ornare augue vestibulum purus

FIG. 4

BASIC INC. v LEVINSON, 485 U.S. 224, United States Supreme Court (1988)

Page 224

★★★★★

This page has been cited 418 times since 1988

How this page has been cited

"Lorem ipsum dolor sit amet, purus hendrerit volutpat eu eget urna." Phasellus ac molestie lacinia dui. +76 similar citations "Cras fermentum, diam at lacinia dignissim felis tortor ut est." Nam et erat neque. Vestibulum +117 similar citations "Lorem ipsum dolor sit amet, purus hendrerit volutpat eu eget urna." Phasellus ac molestie lacinia dui. +65 similar citations "Cras fermentum, diam at lacinia dignissim felis tortor ut est." Nam et erat neque. Vestibulum +38 similar citations 76 Citations          Close <

Proin lobortis nec sapien id porttitor. Donec nec tellus et arcu placerat dapibus in in orci. Pellentesque efficitur hendrerit quam, in tempus.

Fusce mattis tellus nunc, id ullam metus facilisis et. Quisque velit sollicitudin eget lacus sed, vestibu suscipit urna. Vestibulum a dictum.

Nulla posuere venenatis lorem, vel dictum ante. Nunc pellentesque orci pulvinar ipsum fringilla, ac laoreet sugar illis cars dui diam sit Maecenas finibus ipsum ac quam euismod lacinia. Morbi ornare id risus at maximus. Mauris pharetra tellus enim, vel volutpat nulla Quisque velit sollicitudin eget lacus sed, vestibu suscipit urna.

Citing BASIC INC. v. LEVINSON          Close ×
FERDINAND DREXEL INV. CO, INC v. ALIBERT
723 F.Supp. 313 (1989)    October 16th, 1989

Open in New Tab    Star ☆

"Lorem ipsum dolor sit amet, consectetur adipiscing elit. Curabitur vel hendrerit turpis, eget pharetra sapien. Etiam ut nibh porta, condimentum massa quis." blandit mi. Donec placerat, ipsum sed consequat congue, Basic, Incorporated v. Levinson, 485 U.S. 224, 108 S.Ct. 978, 99 L.Ed.2d 194 (1988). ac aliquam augue condimentum quis. Ut faucibus turpis non ante bibendum, vitae fringilla augue dignissim Quisque turpis elit, aliquet ut dui vel, vehicula consequat libero. Sed in vestibulum sem. Donec malesuada id elit vitae varius. Donec sem dui, feugiat eget ultrices non, molestie vel elit. Etiam consequat, nunc ut molestie viverra, augue elit dapibus nisi Cras vestibulum, dolor non vestibulum porttitor, dolor tortor convallis ante, id rutrum tellus tellus nec leo. Quisque ornare rhoncus est, convallis iaculis metus convallis id.

***

¶1    JUSTICE BLACKMUN delivered the opinion of the Court.

FIG. 6

APPARATUS AND METHOD FOR SUBSEQUENT REFERENCE INFORMED LEGAL RESEARCH

CROSS-REFERENCE TO RELATED APPLICATION

This application claims priority to U.S. Provisional Patent Application 62/078,897, filed Nov. 12, 2014, the contents of which are incorporated herein by reference.

FIELD OF THE INVENTION

This invention relates generally to computerized legal research. More particularly, this invention relates to techniques for subsequent reference informed legal research.

BACKGROUND OF THE INVENTION

Computerized legal research tools typically supply a list of case citations in response to a query. The case citations are typically listed by relevance to the query and include accompanying text snippets.

Such a paradigm makes it difficult for a user to understand relationships between cases, the relative significance of individual cases independent of the query and overall trends associated with an individual legal concept implicated by a query.

In view of the foregoing, it would be desirable to provide a new paradigm for supplying results to a legal query. More particularly, it would be desirable to provide techniques for informing a reader about subsequent references to text in a legal decision.

SUMMARY OF THE INVENTION

A non-transitory computer readable storage medium has instructions executed by a processor to supply text from a court decision. Indicia of the number of subsequent citations to the court decision are provided adjacent to the text. The indicia include at least one of a case citation count and associated visualization, a page citation count and associated visualization and page rank indicia.

BRIEF DESCRIPTION OF THE FIGURES

The invention is more fully appreciated in connection with the following detailed description taken in conjunction with the accompanying drawings, in which:

FIG. 2 illustrates an exemplary graphical user interface that may be used to display subsequent citations in accordance with an embodiment of the invention.

FIG. 3 illustrates an exemplary graphical user interface that may be used to display subsequent citations in accordance with an embodiment of the invention.

FIG. 4 illustrates subsequent citation details displayed in accordance with an embodiment of the invention.

FIG. 6 illustrates text snippets supplied in accordance with another embodiment of the invention.

Like reference numerals refer to corresponding parts throughout the several views of the drawings.

DETAILED DESCRIPTION OF THE INVENTION

Figure 1:
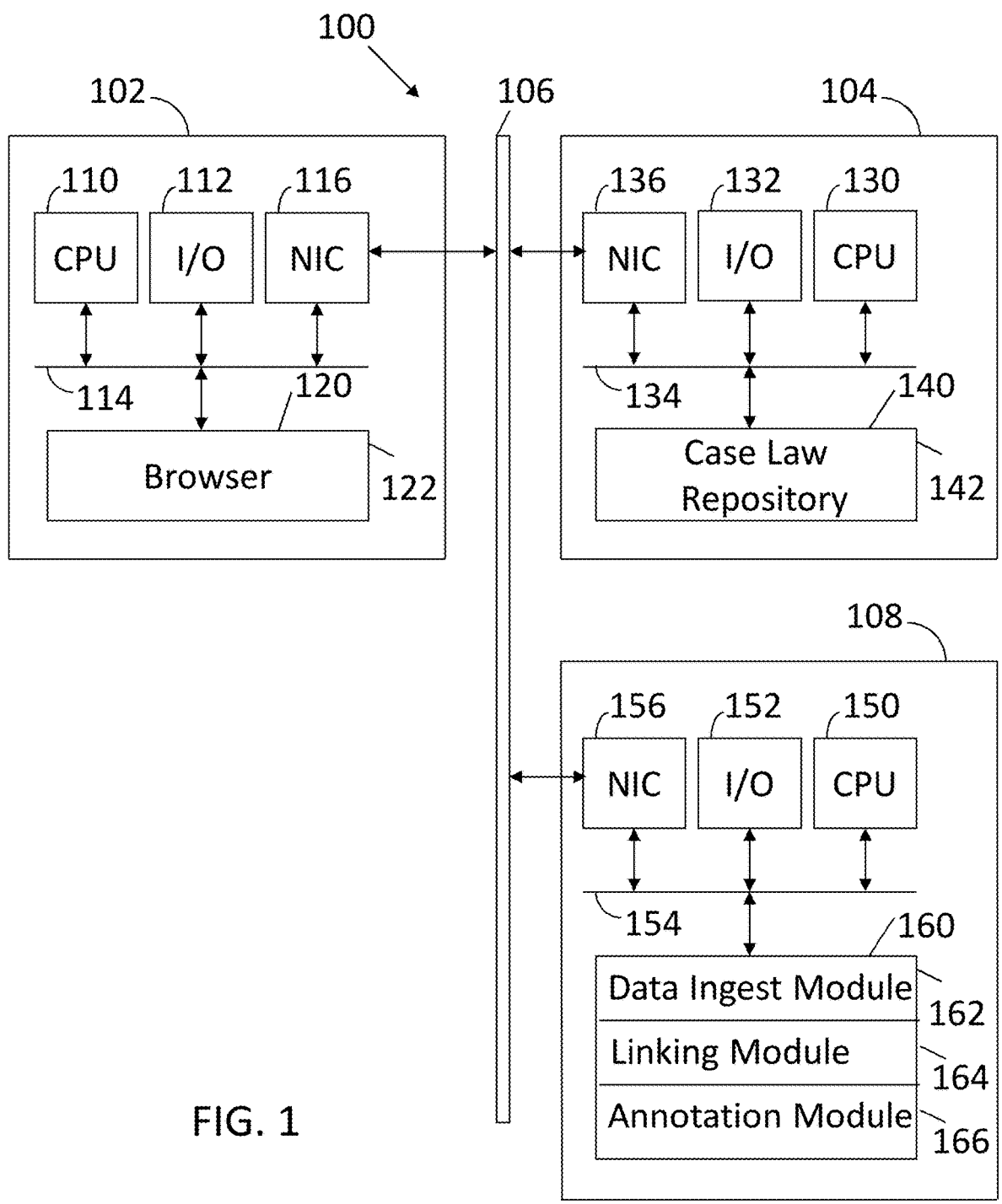
FIG. 1 illustrates a system configured in accordance with an embodiment of the invention.

FIG. 1 illustrates a system 100 configured in accordance with an embodiment of the invention. The system 100 includes standard components, such as a client device 102 coupled to a server 104 via a network 106, which may be any wired or wireless network. A server 108 to implement operations of the invention is also connected to the network 106.

Client device 102 includes standard components, such as a central processing unit 110 and input/output devices 112 connected via a bus 114. The input/output devices 112 may include a keyboard, mouse, touch display and the like. A network interface card 116 is also connected to the bus 114 to provide connectivity to network 106. A memory 120 is also connected to the bus 114. The memory 120 stores executable code, such as a browser 122. The browser 122 may be used to execute a search and receive search results configured in accordance with embodiments of the invention.

Server 104 also includes standard components, such as a central processing unit connected to input/output devices 132 via a bus 134. A network interface card 136 is also connected to the bus 134. A memory 140 is also connected to bus 134. The memory 140 stores a case law repository 142. For example, the case law repository 142 may include case law for the U.S. Supreme Court, U.S. Appellate Courts and U.S. District Courts. The case law repository 142 may also include case law for hierarchical courts of individual states. The case law repository 142 may be a publicly available resource or a proprietary resource. The case law repository 142 may be distributed across a number of servers 104.

Server 108 also includes standard components, such as a central processing unit 150 and input/output devices 152 connected via a bus 154. A network interface card 156 is also connected to the bus 154. In addition, a memory 160 is connected to the bus 154. The memory stores executable modules to implement operations of the invention. In one embodiment, the memory 160 stores a data ingest module 162. The data ingest module 162 includes executable instructions to access case law repository 142 and process the contents therein. The processing of the content may be replicating the content or creating links to segments of the content. This results in a linking module 164. The linking module 164 may be a repository of replicated content that can be linked to or it may be a database of links pointing to content in the case law repository 142.

The data ingest module 162 also annotates the content in the case law repository 142. The annotations may categorize the content by legal topics, holdings, cross-citations to other cases, common phrases or semantic features, or other criteria. This processing results in an annotation module 166, which contains annotations associated with the content in the case law repository 142. More particularly, the annotation module 166 generates subsequent case citations of the type disclosed herein.

FIG. 2 illustrates a legal case, in this example, the case Basic v. Levinson, 485 U.S. 224 (1988). In an embodiment of the invention, the case's page numbers are shown in the left-hand column 200 adjacent to the page's location within the case.

Every page of a case is ranked based on the frequency with which that page is cited by subsequent legal cases or other references. In one embodiment, a case citation count and associated visualization 202 is supplied. A page citation count and associated visualization 204 is also supplied. Page rank indicia 206, in this case indicated by stars, may also be supplied. More stars correspond to a higher number of subsequent citations to that page, less stars correspond to less references. The user can hover his or her mouse over the star-ranking to cause a popup window 300 to appear, as shown in FIG. 3. The popup window 300 displays the corresponding citation frequency. For example, the user could hover the mouse over the 3-star ranking of page 224 in Basic v. Levinson to display a popup window 300 indicating that page 224 has been "cited more than 100 times". An embodiment of the invention includes a chart indicating the frequency with which a given page of a legal case is cited by subsequent references over time.

In one embodiment of the invention, every subsequent reference that cites to a page of the case is associated with and linked to that page. The invention analyzes the text before and after each citation to the case in each subsequent reference and determines which sentences before and after each citation provide context for understanding the manner and reason for that citation in the subsequent reference. In other words, the invention selects a "snippet of text" to provide context for each subsequent citation.

In one embodiment of the invention, as shown in FIG. 4, subsequent references may be displayed adjacent to the page of the case with which it is associated. The user may control which subsequent references he or she can view on the screen, for example by activating link 400. In another embodiment of the invention, the user can sort or filter a list of subsequent references by clicking a button to select a parameter, such as relevance, date or jurisdiction.

Figure 5:
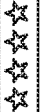
FIG. 5 illustrates text snippets supplied in accordance with another embodiment of the invention.

FIG. 5 illustrates that a snippet or snippets of text provide context for the citation. For example, when the user hovers the mouse over the name of the subsequent reference, text 500 from the subsequent reference is displayed on the computer screen.

For every page of the case, the invention may measure the similarity of the snippet of text for each citation to that page, and may create groups of subsequent references in which the snippets of text are similar.

In one embodiment, each snippet is mapped to a lower dimensional space using Latent Dirichlet Allocation (LDA). The clustering algorithm computes the similarity between the snippets based on the representation of the snippets in the lower dimensional space to create groups. For each group, the representative sentence is selected. The representative sentence is selected by computing the average of all snippets within the group. For each sentence in each group, the distance between the sentence and the average snippet is computed and the sentence closest to the average snippet is selected as the representative sentence.

For each group of subsequent references associated with a page of a case, the system may then display the representative sentence for that group. The user may have the option to view any other subsequent references in a group of subsequent references.

As shown in FIG. 6, the full snippet text associated with a representative sentence may be displayed, for example, when the user hovers a mouse over the representative sentence. One may also display the name of the case or reference from which the sentence originated. For example, the user clicks the representative sentence that comes from subsequent reference FERDINAND DREXEL INV. CO., INC. v. ALIBERT, 723 F. Supp. 313 (E. D. Pa. 1989) to generate a column 600 that displays snippets of text from other subsequent references.

Returning to FIG. 5, text 500 is associated with the citation from City of Philadelphia v. Fleming Companies, Inc., 265 F.3d 1245 (10th Cir. 2001). This snippet is shown in conjunction with the originally viewed case Basic v. Levinson, 485 U.S. 224 (1988).

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium with computer-executable instructions that, when executed by a processor, cause the processor to:
   supply text from a court decision;
   create groups of subsequent cases that cite the court decision that have similar snippets of text by utilizing a clustering algorithm to compute a similarity value between snippets of the text based on a representation of the snippets in a lower dimensional space to create groups, wherein for each group, a representative sentence is selected by computing an average snippet of all snippets within the group, and for each sentence in each group, a distance between the sentence and the average snippet is computed and the sentence closest to the average snippet is selected as the representative sentence; and
   provide, adjacent to the text, a chart providing a visual depiction of a frequency over time with which a selected page of the court decision is cited by subsequent decisions, as determined by the clustering algorithm.

2. The non-transitory computer readable storage medium of claim 1 wherein the indicia includes a case citation count and associated visualization.

3. The non-transitory computer readable storage medium of claim 1 wherein the indicia includes a page citation count and associated visualization.

4. The non-transitory computer readable storage medium of claim 1 wherein the indicia includes page rank indicia, wherein each page of the court decision is ranked based on the frequency with which that page is cited by subsequent legal cases.

5. The non-transitory computer readable storage medium of claim 1 further comprising instructions executed by the processor to display a snippet of text associated with a subsequent case that cites the court decision in response to a pointer hovering over a representative sentence.

6. The non-transitory computer readable storage medium of claim 1 further comprising instructions executed by the processor to analyze text before and after each citation to the court decision in each subsequent reference and identify sentences before or after each citation that provide context for understanding the manner and reason for that citation in the subsequent reference.

7. The non-transitory computer readable storage medium of claim 4 further comprising instructions executed by the processor to cause a popup window to appear that displays a corresponding citation frequency based upon a pointer hovering over the page rank indicia wherein a quantity above a threshold quantity is stated as exceeding the threshold quantity.

8. A computer-implemented method comprising:
supply text from a court decision;
create groups of subsequent cases that cite the court decision that have similar snippets of text by utilizing a clustering algorithm to compute a similarity value between snippets of the text based on a representation of the snippets in a lower dimensional space to create groups, wherein for each group, a representative sentence is selected by computing an average snippet of all snippets within the group, and for each sentence in each group, a distance between the sentence and the average snippet is computed and the sentence closest to the average snippet is selected as the representative sentence; and
provide, adjacent to the text, a chart providing a visual depiction of a frequency over time with which a selected page of the court decision is cited by subsequent decisions, as determined by the clustering algorithm.

9. The computer implemented method of claim 8 wherein the indicia includes a case citation count and associated visualization.

10. The computer implemented method of claim 8 wherein the indicia includes a page citation count and associated visualization.

11. The computer implemented method of claim 8 wherein the indicia includes page rank indicia and wherein each page of the court decision is ranked based on the frequency with which that page is cited by subsequent legal cases.

12. The computer implemented method of claim 8 further comprising displaying a snippet of text associated with a subsequent case that cites the court decision in response to a pointer hovering over a representative sentence.

13. The computer implemented method of claim 8 further comprising analyzing text before and after each citation to the court decision in each subsequent reference and identify sentences before or after each citation that provide context for understanding the manner and reason for that citation in the subsequent reference.

14. The computer implemented method of claim 11 further comprising displaying a corresponding citation frequency based upon a pointer hovering over the page rank indicia wherein a quantity above a threshold quantity is stated as exceeding the threshold quantity.

15. A system comprising:
memory;
a processor coupled to the memory, the processor being configured to:
supply text from a court decision;
create groups of subsequent cases that cite the court decision that have similar snippets of text by utilizing a clustering algorithm to compute a similarity value between snippets of the text based on a representation of the snippets in a lower dimensional space to create groups, wherein for each group, a representative sentence is selected by computing an average snippet of all snippets within the group, and for each sentence in each group, a distance between the sentence and the average snippet is computed and the sentence closest to the average snippet is selected as the representative sentence; and
provide, adjacent to the text, a chart providing a visual depiction of a frequency over time with which a selected page of the court decision is cited by subsequent decisions, as determined by the clustering algorithm.

16. The system of claim 15 wherein the indicia includes a page citation count and associated visualization.

17. The system of claim 15 wherein the indicia includes page rank indicia and wherein each page of the court decision is ranked based on the frequency with which that page is cited by subsequent legal cases.

18. The system of claim 15 wherein the processor is further configured to output a snippet of text associated with a subsequent case that cites the court decision in response to a pointer hovering over a representative sentence.

19. The system of claim 15 wherein the processor is further configured to analyze text before and after each citation to the court decision in each subsequent reference and identify sentences before or after each citation that provide context for understanding the manner and reason for that citation in the subsequent reference.

20. The system of claim 17 wherein the processor is further configured to cause a popup window to appear that displays a corresponding citation frequency based upon a pointer hovering over the page rank indicia wherein a quantity above a threshold quantity is stated as exceeding the threshold quantity.

* * * * *